US007385971B1

(12) United States Patent
Ferris

(10) Patent No.: US 7,385,971 B1
(45) Date of Patent: Jun. 10, 2008

(54) LATENCY REDUCTION IN NETWORK DATA TRANSFER OPERATIONS

(75) Inventor: Scott M. Ferris, Edina, MN (US)

(73) Assignee: Cisco Technology, Inc., San Jose, CA (US)

( * ) Notice: Subject to any disclaimer, the term of this patent is extended or adjusted under 35 U.S.C. 154(b) by 966 days.

(21) Appl. No.: 10/143,493

(22) Filed: May 9, 2002

(51) Int. Cl.
*H04L 12/28* (2006.01)

(52) U.S. Cl. .................. 370/389; 370/401; 709/217; 709/213

(58) Field of Classification Search ............... None
See application file for complete search history.

(56) References Cited

U.S. PATENT DOCUMENTS

| | | | |
|---|---|---|---|
| 5,390,326 | A | 2/1995 | Shah |
| 5,579,491 | A | 11/1996 | Jeffries et al. |
| 5,996,024 | A | 11/1999 | Blumenau |
| 6,041,381 | A | 3/2000 | Hoese |
| 6,108,699 | A | 8/2000 | Moiin |
| 6,131,119 | A | 10/2000 | Fukui |
| 6,134,673 | A | 10/2000 | Chrabaszcz |
| 6,145,019 | A | 11/2000 | Firooz et al. |
| 6,151,331 | A * | 11/2000 | Wilson ............ 370/465 |
| 6,163,855 | A | 12/2000 | Shrivastava et al. |
| 6,185,620 | B1 | 2/2001 | Weber et al. |
| 6,195,760 | B1 | 2/2001 | Chung et al. |
| 6,209,023 | B1 | 3/2001 | Dimitroff et al. |
| 6,219,771 | B1 | 4/2001 | Kikuchi et al. |
| 6,314,526 | B1 | 11/2001 | Arendt et al. |
| 6,343,320 | B1 | 1/2002 | Fairchild et al. |
| 6,363,416 | B1 | 3/2002 | Naeimi et al. |

(Continued)

OTHER PUBLICATIONS

Gusella, R., et al., "An Election Algorithm for a Distributed Clock Synchronization Program", *Report No. UCB/CSD 86/257*, University of California, Berkeley, (Dec. 1985), 1-17.

(Continued)

*Primary Examiner*—Bob A. Phunkulh
(74) *Attorney, Agent, or Firm*—Schwegman, Lundberg & Woessner, P.A.

(57) ABSTRACT

Apparatus, method and computer readable medium are provided for data transfer wherein an initiator driver in a computing system performs a first write operation to a target system wherein the write operation transfers a block of data from the computing system to the target, the write operation including sending a plurality of data packets which together form the block of data, wherein some or all of the data packets are sent only after the driver receives a ready to transfer command from the target. The initiator driver receives a request for a second write operation from the computing system before all the data packets for the first write operation have been sent, and sending a write command to the target in-between sending two of the data packets so that the second write command is sent before completion of the first write operation. According to another aspect, the initiator driver receives a request from the computing system to perform two or more write operations prior to initiating the first write operation and while no other write operations are being performed, and wherein the initiator system sends at least two write commands, one for each request for a write operation, to the target system prior to receiving a ready to transfer command from the target system.

4 Claims, 4 Drawing Sheets

U.S. PATENT DOCUMENTS

| | | | |
|---|---|---|---|
| 6,393,583 B1 | 5/2002 | Meth et al. | |
| 6,400,730 B1 | 6/2002 | Latif et al. | |
| 6,449,652 B1 | 9/2002 | Blumenau et al. | |
| 6,470,397 B1 | 10/2002 | Shah et al. | |
| 6,473,803 B1 | 10/2002 | Stern et al. | |
| 6,480,901 B1 | 11/2002 | Weber et al. | |
| 6,484,245 B1 | 11/2002 | Sanada et al. | |
| 6,574,755 B1 | 6/2003 | Seon | |
| 6,640,278 B1 | 10/2003 | Nolan et al. | |
| 6,654,830 B1 | 11/2003 | Taylor et al. | |
| 6,678,721 B1 | 1/2004 | Bell | |
| 6,683,883 B1 | 1/2004 | Czeiger et al. | |
| 6,691,244 B1 | 2/2004 | Kampe et al. | |
| 6,697,924 B2 | 2/2004 | Swank | |
| 6,701,449 B1 | 3/2004 | Davis et al. | |
| 6,711,632 B1* | 3/2004 | Chow et al. | 710/29 |
| 6,718,361 B1 | 4/2004 | Basani et al. | |
| 6,721,907 B2 | 4/2004 | Earl | |
| 6,724,757 B1 | 4/2004 | Zadikian et al. | |
| 6,742,034 B1* | 5/2004 | Schubert et al. | 709/226 |
| 6,748,550 B2 | 6/2004 | McBrearty et al. | |
| 6,757,291 B1 | 6/2004 | Hu | |
| 6,763,195 B1 | 7/2004 | Willebrand et al. | |
| 6,763,419 B2 | 7/2004 | Hoese et al. | |
| 6,771,663 B1 | 8/2004 | Jha | |
| 6,807,581 B1 | 10/2004 | Starr et al. | |
| 6,834,326 B1* | 12/2004 | Wang et al. | 711/114 |
| 6,876,656 B2* | 4/2005 | Brewer et al. | 370/392 |
| 6,877,044 B2 | 4/2005 | Lo et al. | |
| 6,895,461 B1 | 5/2005 | Thompson | |
| 2002/0042693 A1 | 4/2002 | Kampe et al. | |
| 2002/0049845 A1 | 4/2002 | Sreenivasan et al. | |
| 2002/0059392 A1 | 5/2002 | Ellis | |
| 2002/0065872 A1 | 5/2002 | Genske et al. | |
| 2002/0114328 A1* | 8/2002 | Miyamoto et al. | 370/389 |
| 2002/0116460 A1 | 8/2002 | Treister et al. | |
| 2002/0188657 A1 | 12/2002 | Traversat et al. | |
| 2002/0188711 A1 | 12/2002 | Meyer et al. | |
| 2002/0194428 A1 | 12/2002 | Green | |
| 2003/0012204 A1* | 1/2003 | Czeiger et al. | 370/401 |
| 2003/0018813 A1 | 1/2003 | Antes et al. | |
| 2003/0018927 A1 | 1/2003 | Gadir et al. | |
| 2003/0058870 A1 | 3/2003 | Mizrachi et al. | |
| 2003/0084209 A1 | 5/2003 | Chadalapaka | |
| 2003/0093541 A1* | 5/2003 | Lolayekar et al. | 709/230 |
| 2003/0093567 A1* | 5/2003 | Lolayekar et al. | 709/246 |
| 2003/0097607 A1 | 5/2003 | Bessire | |
| 2003/0126282 A1* | 7/2003 | Sarkar et al. | 709/237 |
| 2003/0172149 A1* | 9/2003 | Edsall et al. | 709/224 |
| 2003/0210686 A1 | 11/2003 | Terrell et al. | |
| 2004/0064553 A1 | 4/2004 | Kjellberg | |
| 2004/0225775 A1* | 11/2004 | Pellegrino et al. | 710/200 |
| 2005/0055418 A1 | 3/2005 | Blanc | |

OTHER PUBLICATIONS

Gusella, R., et al., "The Berkeley UNIX® Time Synchronization Protocol", *UNIX Programmers Manual 4.3*, vol. 2C, Berkeley Software Distrib., (1986), 10 pgs.

Knight, S., et al., *Virtual Router Redundancy Protocol*, Network Working Group, RFC 2338, Retrieved from the Internet: <http://www.search.ietf.org/rfc/rfc2338.txt>, (1998), 26 pgs.

Lewis, P., "A High-Availability Cluster for Linux", *Linux Journal*, 64, Retrieved from the Internet: <http://www2.linuxjournal.com/lj-issues/issue64/3247.html>, (Apr. 1994), 11 pgs.

Li, T., et al., *Cisco Hot Standby Router Protocol (HSRP)*, Network Working Group, RFC 2281, Retrieved from the Internet: <http://www.search.ietf.org/rfc/rfc2281.txt>, (1998), 16 pgs.

Meth, K. Z., et al., "Design of the iSCSI Protocol", *Proceedings of the 20th IEEE Conference on Mass Storage Systems and Technologies*, (Apr. 7-10, 2003), 116-122.

Moore, K., *On the Use of HTTP as a Substrate*, Network Working Group, RFC 3205, Retrieved from the Internet: <http://www.search.ietf.org/rfc/rfc3205.txt>, (2002), 14 pgs.

Satran, J., et al., *iSCSI*, IPS Internet Draft, draft-ietf-ips-iSCSI-00, Category: Standards Track, Retrieved from the Internet: <http://www.haifa.il.ilb.com/satran/ips/draft-ietf-ips-iSCSI-00.txt>, (Nov. 2000), 78 pgs.

Satran, J., et al., *iSCSI*, IPS Internet Draft, draft-ietf-ips-iSCSI-12.txt, Category: standards—track, (Apr. 17, 2002), 260 pgs.

Simitci, H., et al., "Evaluation of SCSP over TCP/IP and SCSI over Fibre Channel Connections", *Hot Interconnects*, 9, (Aug. 2001), 87-91.

* cited by examiner

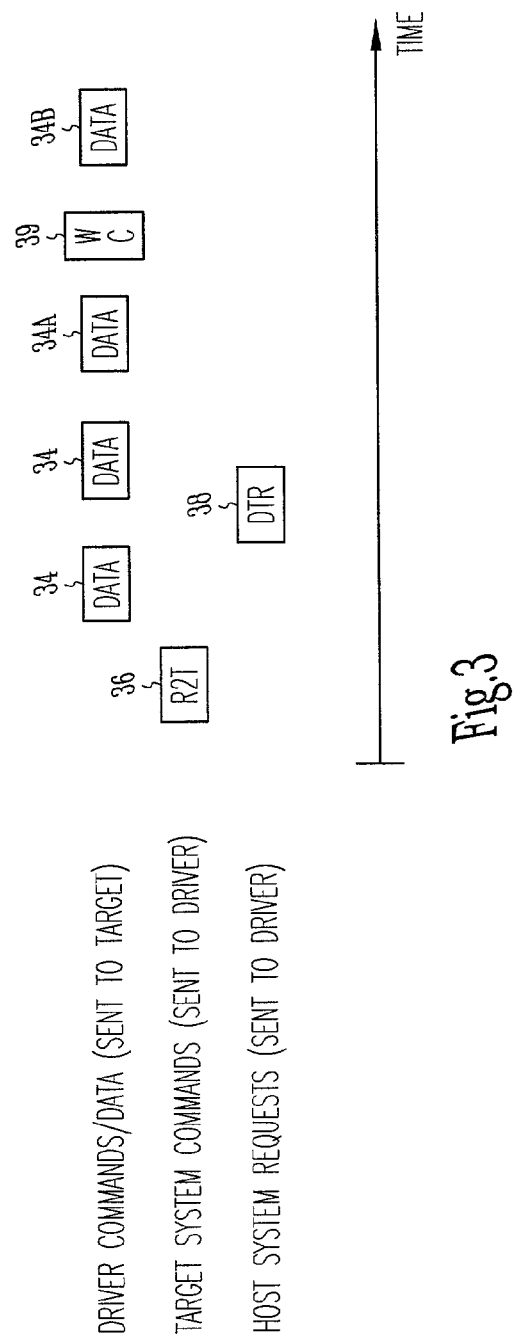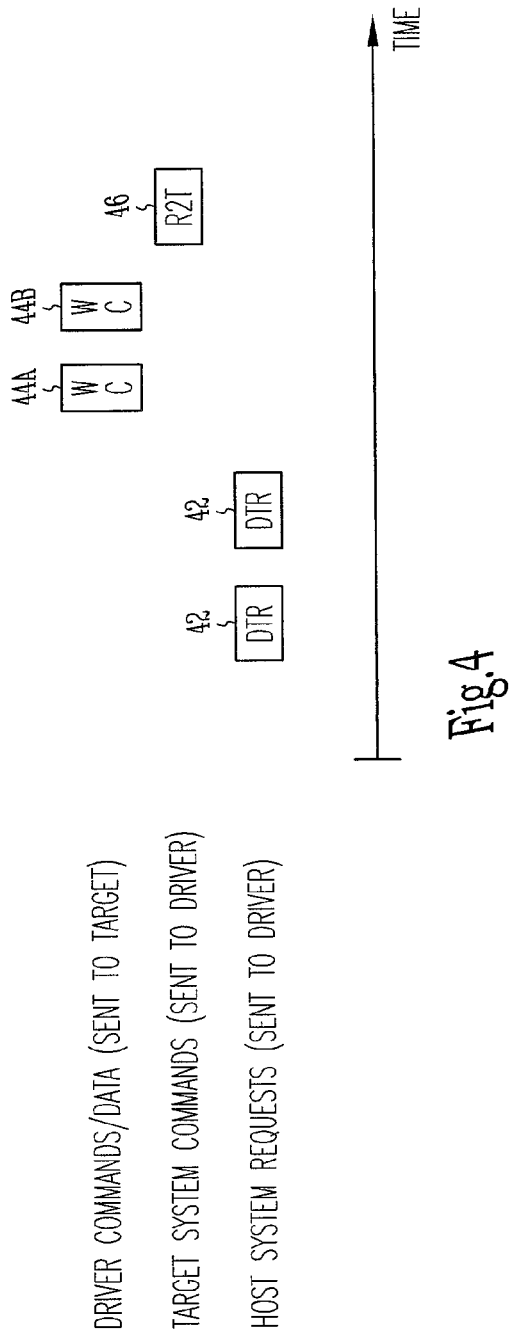

LATENCY REDUCTION IN NETWORK DATA TRANSFER OPERATIONS

This invention is related to application Ser. No. 10/143,456, filed May 9, 2002, entitled "SYSTEM, METHOD, AND SOFTWARE FOR A VIRTUAL HOST BUS ADAPTER IN A STORAGE-AREA NETWORK"; application Ser. No. 10/128,656, filed Apr. 22, 2002, entitled "SCSI-BASED STORAGE AREA NETWORK", application Ser. No. 10/131,793, filed Apr. 22, 2002, entitled "VIRTUAL SCSI BUS FOR SCSI-BASED STORAGE AREA NETWORK", all of the above of which are hereby incorporated by reference.

TECHNICAL FIELD OF THE INVENTION

This invention relates generally to latency reduction in data transfer operations, and more particularly to latency reduction in network data transfers.

BACKGROUND OF THE INVENTION

In a SCSI interface the data transfer protocol provides that the target storage system controls the data transfer between it and the requesting or initiating system. In a typical data transfer scenario, an initiator driver on the requesting system originates SCSI commands and these commands are sent to the storage system without advanced permission. Generally, however, data transfers from the requesting system to the target are not proper protocol without express or implied permission from the target. Express permission is granted using a "ready to transfer" (known as a "R2T" in SCSI terminology) command sent by the target.

Prior to a data transfer operation, SCSI allows the initiator driver on the requesting system to negotiate with the target to establish the size of permissible data chunks, known as PDU's (physical data units). The smallest PDU is typically 8 Kbytes in length, with 64 Kbytes being a larger PDU size. Once this negotiation is completed, the initiator driver sends data to the target in the agreed upon PDU size. Other than the case of implied R2T's where an actual R2T need not be sent, all other transfers of a PDU from the initiator driver requires the target to first send a R2T command granting express permission for the driver to send the PDU.

The time that an initiator driver waits between sending a PDU and receiving the next R2T command is a function of the latency in the network over which the data is being transferred. If the network has a "high" latency, as may occur in TCP/IP iSCSI protocols, there is a relatively long delay between the last PDU being sent and the next R2T arriving back at the initiator driver. This delay has the effect of lengthening the time that the overall data transfer (that is the entire block of data sought to be transferred) takes to complete. This extra time in turn often prevents the computing or other requesting system that requires the data transfer from starting other work that requires the completed transfer. Accordingly, it is desirable if these delays can be reduced so that work can be more quickly and efficiently performed by the requesting system.

SUMMARY OF THE INVENTION

The present invention includes various example embodiments for performing write operations from an initiator system to a target, and more specifically but not by limitation for performing such operations using a SCSI interface.

BRIEF DESCRIPTION OF THE DRAWINGS

FIGS. 2, 3, 4 and 5 illustrate example method and apparatus embodiments of the invention.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
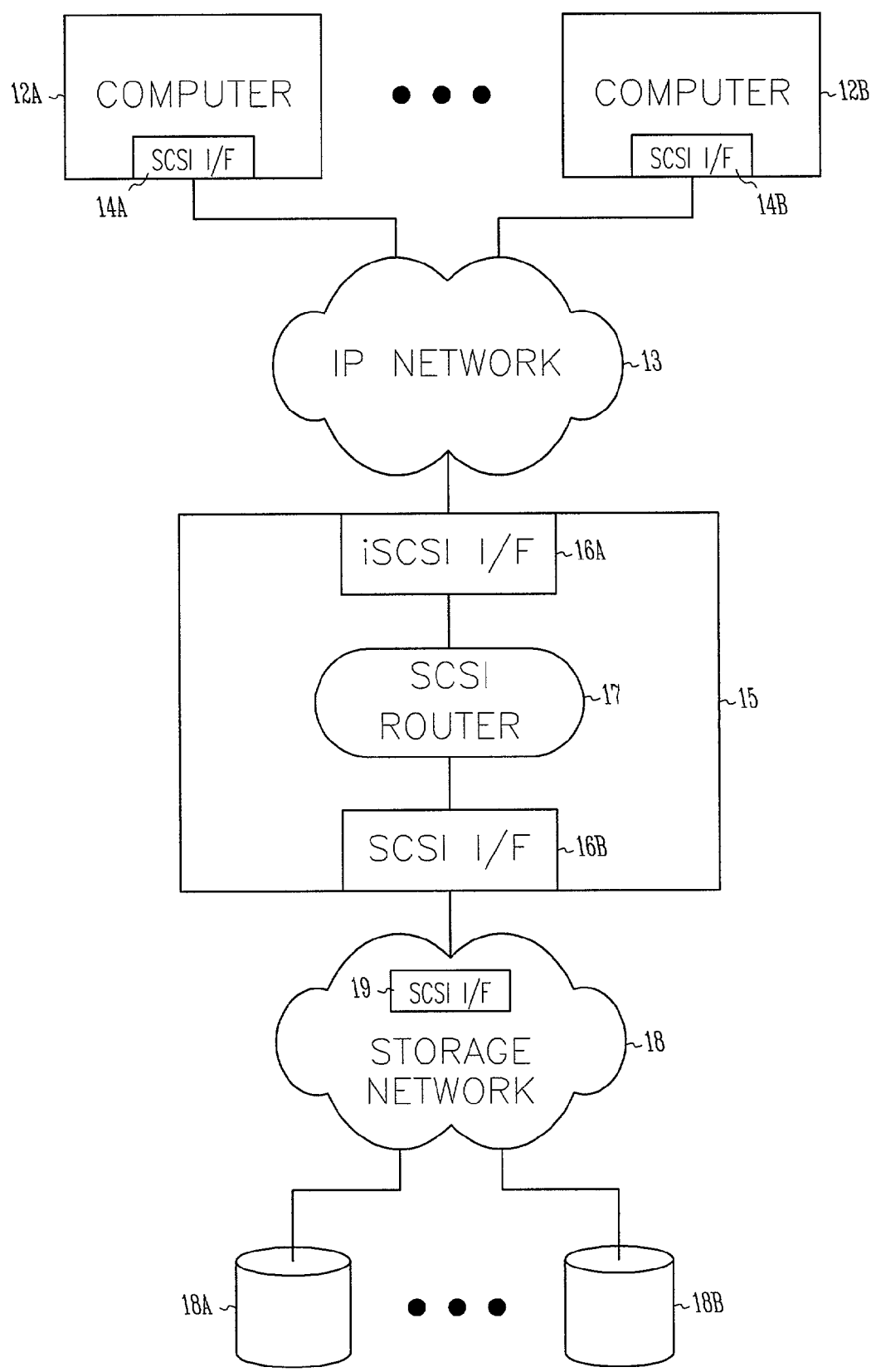
FIG. 1 illustrates an example environment for the embodiments of the invention.

Referring now to FIG. 1, there is illustrated an overview of an environment in which some or all of the embodiments of the invention may be used. Computing systems 12a and 12b are connected to a target storage network 18 having storage units 18a and 18b through an IP network 13. Systems 12a and 12b each include a SCSI interface 14a and 14b, respectively, which interface with a storage router 15 having SCSI interfaces 16a and 16b, and a SCSI router unit 17. Router 15 in turns connects to storage network 18 through a SCSI interface 19. In this configuration, systems 12a and 12b transfer data back and forth to storage network 18 using a TCP/IP protocol. A storage router 15 which could be used with the present invention is described in "SCSI-BASED STORAGE AREA NETWORK" and "VIRTUAL SCSI BUS FOR SCSI-BASED STORAGE AREA NETWORK", as described above, the description of which is incorporated herein by reference. A virtual Host Bus Adapter is described in "SYSTEM, METHOD, AND SOFTWARE FOR A VIRTUAL HOST BUS ADAPTER IN A STORAGE-AREA NETWORK", the description of which is incorporated herein by reference.

Figure 2:
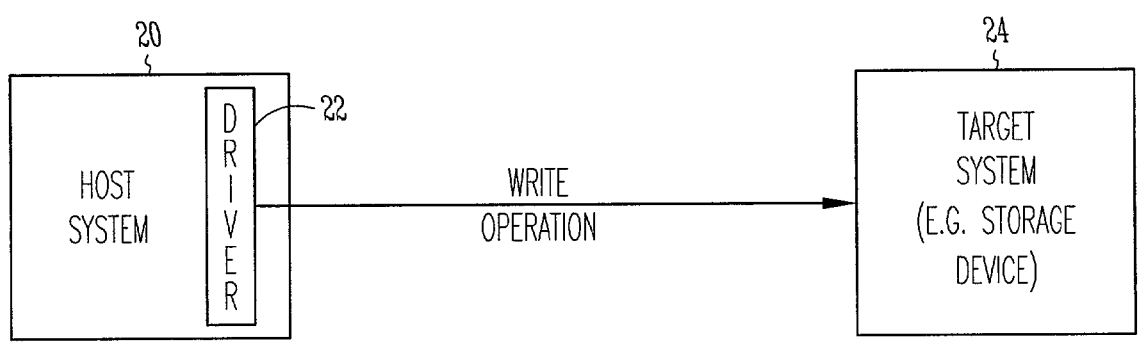

Referring now to FIGS. 2 and 3, there is illustrated a first embodiment of a method and apparatus according to the present invention. An initiator driver 22 in a computing system 20 performs a first write operation to a target system 24 wherein the write operation transfers a block of data 32 from the computing system 20 to the target 24, for example through a network using a TCP/IP protocol and configured as shown with respect to FIG. 1. The write operation includes sending a plurality of data packets 34 each in a "data burst" which together form the block of data 32, wherein some or all of the data packets 34 are sent only after the driver receives a ready to transfer command 36 from the target 24. The data packet may be, for instance 8 Kbytes, 16 Kbytes, 64 Kbytes or any other size that the driver 24 and target system permit for the data transfer, and as may be for example negotiated between the driver 22 and the target system 24. the total data block 32 may be any size.

The initiator driver 22 receives a data transfer request 38 (DTR) for a second write operation from the computing system before all the data packets 34 for the first write operation have been sent, and sends a write command (WC) 39 (typically of relatively small size such as 50-100 bytes) to the target 24 in-between sending two of the data packets, for example packets 34a and 34b, so that the second write command (the first one being the one that initiated the first write operation) is sent before completion of the first write operation.

According to another embodiment of the invention illustrated in FIG. 4, the initiator driver 24 receives requests 42 from the computing system 20 to perform two or more write operations prior to initiating the first write operation and while no other write operations are being performed, and wherein the initiator driver 24 sends at least two write commands 44a and 44b (as may be stored in a command queue in a computing operating system), one for each request for a write operation, to the target system 24 prior to receiving a ready to transfer command 46 from the target system 24.

Figure 5:
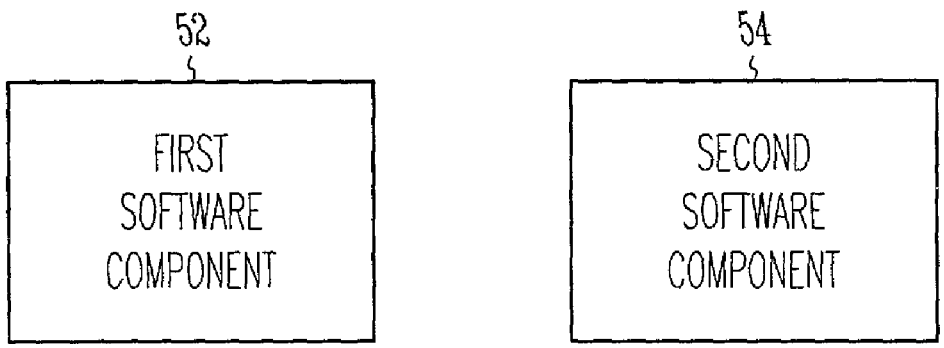

According to still another example embodiment of the invention illustrated in FIG. 5, the initiator driver 24 includes a first software component 52 that is used to perform write operations to a target system, and a second software component 54 that receives a request for write operations from the computing system, and causes a write command to be sent to the target in-between sending two of the data packets so that the write command is sent while the first component is performing a data transfer for a write operation.

According to yet another example embodiment, the second software component 52 receives a request from the computing system to perform two or more write operations while no other write operation in is progress, and wherein the second software component 52 sends at least two write commands, one for each request for a write operation, to the target system prior to receiving a ready to transfer command from the target system.

According to one alternate embodiment of the apparatus of FIG. 5, software components 52 and 54 may be implemented as one software component, or more than two components, while still retaining the functionality described with respect to the components.

Figure 6:
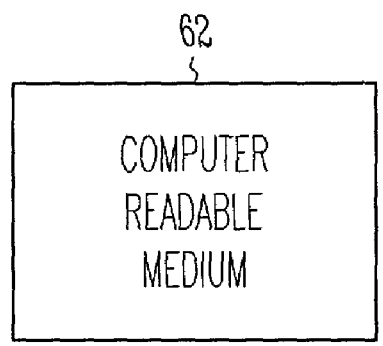
FIG. 6 illustrate an example embodiment of a computer readable medium according to the present invention.

Still another example embodiment of the invention is illustrated in FIG. 6, which shows a computer readable medium 62 that includes computer instructions encoded or otherwise embodied therein for performing the methods or apparatus described above with respect to FIGS. 2-5. According to one example embodiment, the computer readable medium is (without limitation) for example a magnetic medium, an optical medium, a circuit, an electronic data stream or a carrier wave.

According to still another example embodiment of the invention, the methods, apparatus and computer medium described above are adapted specifically for use in an interface, which includes the SCSI protocol. More particularly, one example embodiment of the apparatus, method and computer medium described above is adapted for use with iSCSI, and with the TCP/IP protocol, for example over a local or wide area network. In the SCSI embodiment, the data packets are termed "PDU's."

According to still another example embodiment of the above described invention, driver 24 uses a SCSI protocol, and once a write command is sent to the target the driver has an implied R2T command for the first data packet it needs to send, and it sends this packet before receiving a R2T from the target. In addition, in the SCSI embodiment the R2T can specify the offset for the data packet to be sent.

Thus, as described above, the various embodiments of the invention provide that write commands of relatively small size are sent in advance of longer data packet transfers but due to their small size do not materially slow the progress of the associated write operation. On the other hand, by sending a write command in advance of the completion of a write operation in progress, the target system can process and reply to the write command and prepare for receiving data packets for the associated write operation while the write operation in progress is being performed. As such the target can send a R2T command to the driver simultaneously while the driver is sending data to the target, thereby avoiding the latency associated with propagation delays in the network.

According to still another example embodiment of the invention, the computing system 20 of the embodiments shown herein may be any type of computing device or peripheral, such as but not by way of limitation, a hand-held PDA, a workstation, a personal computer, a main-frame computer, or a mobile wireless system.

The invention claimed is:

1. A method, comprising:
performing, at an initiator driver in a computing system, a first write operation to a target system wherein the write operation transfers a block of data from the computing system to the target, the write operation including sending a plurality of data packets which together form the block of data, wherein some or all of the data packets are sent only after the driver receives a ready to transfer command from the target;
receiving, at the initiator driver, a request for a second write operation from the computing system before all the data packets for the first write operation have been sent, and sending a write command to the target in-between sending two of the data packets so that the second write command is sent before completion of the first write operation.

2. A method according to claim 1 further including receiving, at the initiator driver, a request from the computing system to perform two or more write operations prior to initiating the first write operation and while no other write operations are being performed, and sending, from the initiator driver, at least two write commands, one for each request for a write operation, to the target system prior to receiving a ready to transfer command from the target system.

3. Apparatus, comprising:
an initiator driver in a computing system including a first software component that performs a first write operation to a target system wherein the write operation transfers a block of data from the computing system to the target, the write operation including sending a plurality of data packets which together form the block of data, wherein some or all of the data packets are sent only after the driver receives a ready to transfer command from the target;
the initiator driver including a second software component receiving a request for a second write operation from the computing system before all the data packets for the first write operation have been sent, and sending a write command to the target in-between sending two of the data packets so that the second write command is sent before completion of the first write operation.

4. Apparatus according to claim 3 further wherein the second software component receives a request from the computing system to perform two or more write operations prior to initiating the first write operation and while no other write operations are being performed, and wherein the second software component sends at least two write commands, one for each request for a write operation, to the target system prior to receiving a ready to transfer command from the target system.

* * * * *

UNITED STATES PATENT AND TRADEMARK OFFICE
CERTIFICATE OF CORRECTION

PATENT NO. : 7,385,971 B1  
APPLICATION NO. : 10/143493  
DATED : June 10, 2008  
INVENTOR(S) : Ferris Page 1 of 1

It is certified that error appears in the above-identified patent and that said Letters Patent is hereby corrected as shown below:

In column 1, line 3, below "Title" insert -- RELATED APPLICATIONS --.

In column 1, line 7, delete "NETWORK;" and insert -- NETWORK"; --, therefor.

In column 2, line 57, delete "24." and insert -- 24, --, therefor.

In column 2, line 57, after "may be" insert -- of --.

In column 4, line 56, in Claim 4, after "claim 3" delete "further".

Signed and Sealed this

Second Day of September, 2008

JON W. DUDAS  
*Director of the United States Patent and Trademark Office*